United States Patent [19]
Rivera

[11] Patent Number: 4,549,417
[45] Date of Patent: Oct. 29, 1985

[54] LOCK FOR CYCLES

[76] Inventor: Glenn Rivera, 473 Gregory St., Glendale Heights, Ill. 60139

[21] Appl. No.: 555,285

[22] Filed: Nov. 25, 1983

[51] Int. Cl.$^4$ .............................................. B62H 5/06
[52] U.S. Cl. ........................................ 70/18; 70/225; 70/236
[58] Field of Search ............ 70/236, 18, 58, 15, 70/233, 228, 225

[56] References Cited
U.S. PATENT DOCUMENTS

| 4,019,354 | 4/1979 | O'Dell | 70/236 |
| 4,389,862 | 6/1983 | Hastings | 70/18 |
| 4,409,804 | 10/1983 | Sork | 70/236 |

Primary Examiner—Robert L. Wolfe
Attorney, Agent, or Firm—Dean P. Edmundson

[57] ABSTRACT

A lock for motorcycles, bicycles and the like which have in their driving mechanism a sprocket and chain. Principal parts of the improved lock include a pair of straps which are strong and rigid, preferably made of steel or other strong material. One of the straps extends upwardly behind the chain, then forwardly and then downwardly in front of the chain. The other strap has a flange in front of the first strap then turns forwardly below the chain and then turns upwardly behind the downwardly turned portion of the first strap. A pin is secured to the bottom of the enclosure. The lower portions of the straps have holes which register when the lock is closed and through which the arm of a padlock may be passed.

7 Claims, 5 Drawing Figures

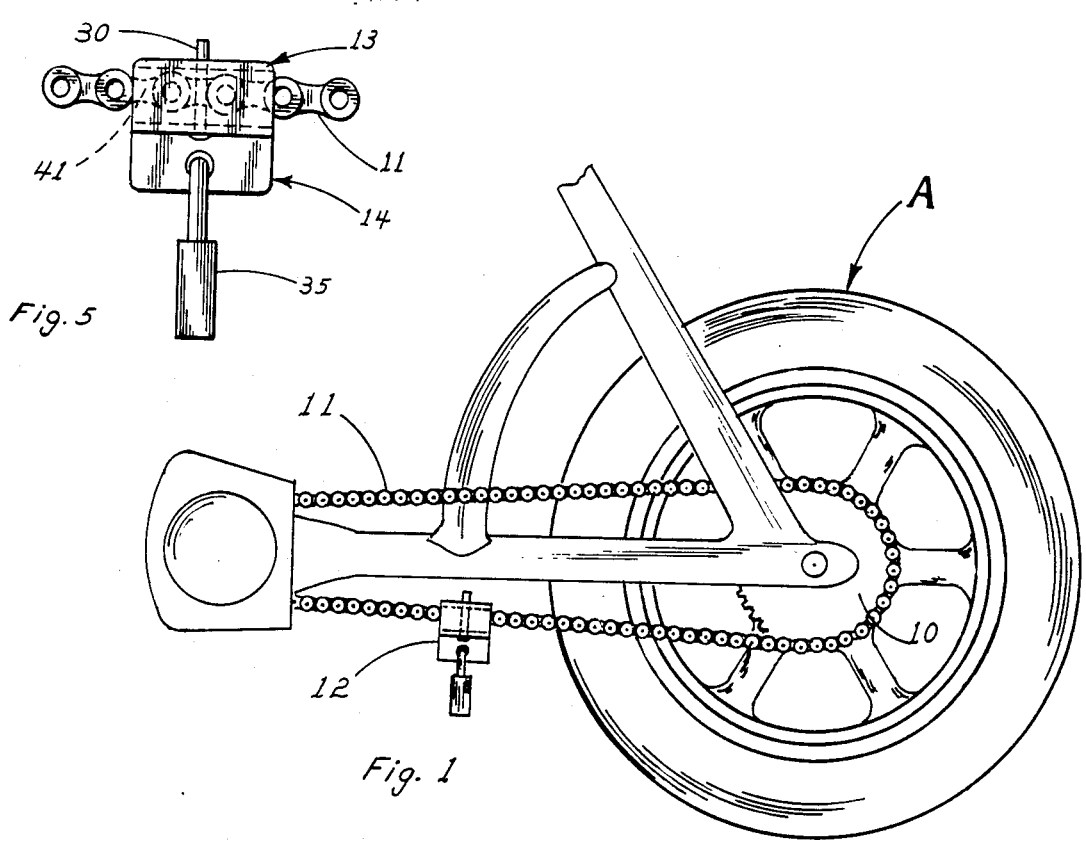
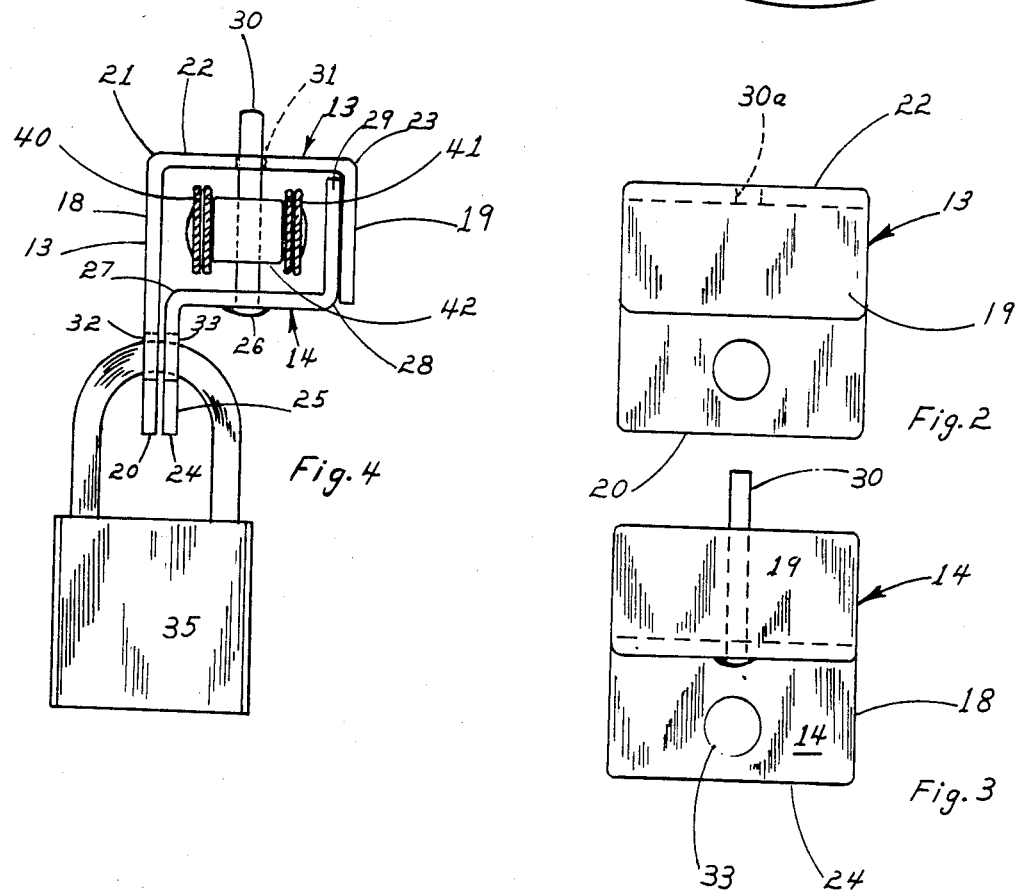

LOCK FOR CYCLES

This invention relates to a lock for a cycle—a bicycle, motorcycle, tricycle, or the like—and particularly to a cycle which includes in its drive mechanism a sprocket gear and chain.

Bicycles, and particularly motorcycles, are known to be subject to theft when the cyclist reaches his destination and parks his cycle. It is relatively easy for a thief to simply pick up a cycle which has been left unattended and ride off with it. Even when the cycle has been secured to some stationary object the thief has only to clip the attachment and ride away on the cycle. Cycles could, of course, be hauled away in a truck or some other vechicle, but this would be more difficult and would increase substantially the chances of being apprehended, or at least noticed, as the theft is taking place.

Accordingly it is an object of this invention to provide a lock which will prevent a thief from mounting the cycle and driving off on it.

Another object is to provide a lock which will attach to the chain commonly used in the drive train of the cycles. It is desired that the lock be simply constructed and easy to affix and to detach. It should be strong and not subject to being pried off or loosened to void the locking function. Other objects and advantages will become apparent as this specification proceeds.

One embodiment of the invention is illustrated in the accompanying drawings in which FIG. 1 is a broken elevational view showing the rear wheel of a motorcycle or bicycle with the improved lock attached to the sprocket chain;

FIG. 2 is an enlarged front view of one of a pair of straps which has been formed for use in the invention;

FIG. 3 is an enlarged front view showing the two straps put together;

FIG. 4 is an enlarged view of the lock as applied to the chain showing the relation between the lock and the chain; and FIG. 5 is a sectional view taken transversely of the chain and also showing the relation between the lock and the relation between the lock and the chain, this view showing the chain in dotted outline.

As illustrated, the motorcycle rear wheel A is driven by the sprocket gear 10 and, and gear 10 is driven by the chain 11. FIG. 1 shows the lock 12 as it is applied to the chain 11.

The construction and assembly of the parts are illustrated more clearly in FIGS. 2 to 4. The lock has a minimum number of parts. The principal parts include a pair of straps 13 and 14. As seen in FIG. 1 the strap in back is strap 13 and the one in front is strap 14.

FIG. 2 shows the strap 13, by itself, and FIG. 4 shows the strap 13 and 14 put together as they are when the lock is closed. FIG. 3 shows strap 14.

Referring now to FIGS. 2 and 4, the strip 13 extends upwardly from its lower end 20 to form the back side 18 of an enclosure, and at 21 strap 13 turns to the horizontal forming the top side 22 of an enclosure, and at 23 it turns downwardly to form an outside wall 19 of the enclosure.

The strip 14 extends upwardly from its end 24 to form the flange 25 and at 27 it turns to the horizontal to form the bottom 26 of the enclosure, then to 28 where it is turned upwardly to form an inside wall 29 of the enclosure. The chain 11 is thus enclosed by walls 18, 22, 29 and 19, and 26.

A pin 30 extends upwardly from a central portion of the wall 26 and is firmly secured to this wall. In the top wall of the enclosure there is a hole 30a which registers with the pin 30 so that when the strap 14 is pushed upwardly of strap 13 the pin enters the hole and is ancored therein. As sprocket chains are commonly constructed there are two series of links, one series 40 on the back and another series 41 in front and the spaced cross bearings 42 extend transversely between the two series of links. The pin 30 extends vertically upward between the two series of links and between the spaced cross bearings (See FIG. 4).

The back panel of strap 13 has a hole 32 which when the strap 14 is pushed upwardly of strap 13 comes into register with the hole 33 in the flange 25 of strap 14. With the straps so engaged the arm of a padlock may be placed through holes 32 and 33 and pressed to bring the padlock into locked condition.

To place the improved lock the operator may simply place the strap 13 over the chain, move the strap 14 upwardly to bring pin 30 into hole 30a and the hole 33 into register with hole 32. When the strap 14 is moved upwardly the enclosure which surrounds the chain is completed and there is no access to the chain which is so enclosed. Also the straps 13 and 14 can not spread apart due to the engagement of pin 30 with these straps and due to the wall 19 being on the outside of wall 29.

Any attempt to ride the cycle while the lock is operative brings the lock into a stalled condition between the chain 11 and the sprocket 10. The lock cannot be opened until the operator comes with a key to remove the padlock 35.

While I have described in detail only one embodiment of the invention it will be apparent that other embodiments may be constructed and many changes may be made, all within the spirit of the invention and the scope of the appended claims.

I claim:

1. A lock for a cycle having a sprocket and a sprocket chain in its drive chain, said lock being adapted to form an enclosure around a portion of said chain and being further adapted to be secured to said chain, wherein said lock comprises first and second rigid straps, said first strap extending upwardly vertically to form the back of said enclosure then forwardly in a horizontal direction to form the top of said enclosure then downwardly in a vertical direction to form a front face of said enclosure; wherein said first strap includes a vertical depending portion which is adapted to extend below said chain when said chain is within said enclosure, wherein said second strap extends in front of said first strap and upwardly to form a vertical flange then forwardly in a horizontal direction to form the bottom of said enclosure then upwardly alongside an end portion of said first strap to form with said end portion a front side of said enclosure, wherein a pin is secured to a horizontal portion of one of said straps and a hole is disposed in said horizontal portion of the other of said straps which is capable of receiving an end of said pin as said pin is advanced toward it, wherein a first hole is disposed in said vertical depending portion of said first strap and a second hole is disposed in said vertical flange of said second strap, wherein said first and second holes are in register when said first and second straps are fitted together to form said enclosure, and wherein locking means extends through said registering holes to lock said first and second straps together.

2. A lock in accordance with claim 1, wherein said chain comprises a series of links on the back and front sides thereof, and wherein said pin is adapted to extend vertically through said chain between said links.

3. A lock in accordance with claim 1, wherein said pin is secured to said second strap.

4. A lock in accordance with claim 1, wherein said second strap extends in a horizontal direction and then vertically upward to a position behind said front face portion of said first strap.

5. A lock in accordance with claim 4, wherein said pin is secured to said second strap and extends upwardly through said chain and into said first hole in the horizontal portion of said first strap.

6. A locking system for a cycle having a sprocket and a sprocket chain in its drive train, said locking system being adapted to form an enclosure around a portion of said chain and being further adapted to be secured to said chain, wherein said locking system comprises first and second straps each having a first end and a second end, wherein said first strap extends upwardly vertically from said first end thereof to form the back of said enclosure then forwardly in a horizontal direction to form the top of said enclosure then downwardly in a vertical direction and terminating with said second end of said first strap; wherein said first end of said first strap forms a vertical depending first flange which is adapted to extend below said chain when said chain is within said enclosure; wherein said second strap extends vertically upward from its first end forming a second flange parallel to said first flange then forwardly in a horizontal direction to form the bottom of said enclosure then upwardly alongside said second end of said first strap to form therewith a front side of said enclosure; wherein a pin is secured to a horizontal portion of one of said straps and a hole is disposed in said horizontal portion of the other of said straps which is capable of receiving an end of said pin as said pin is advanced toward it; wherein a first opening is disposed in said first flange and a second opening is disposed in said second flange, wherein said first and second openings are in register when said first and second straps are fitted together to form said enclosure; and wherein removeable locking means extends through said registering openings to lock said first and second straps together.

7. A locking system in accordance with claim 6, wherein said first and second straps are adapted to fit together around said chain when moved towards each other along a vertical path.

* * * * *